United States Patent (10) Patent No.: US 8,212,199 B2
Hsu (45) Date of Patent: Jul. 3, 2012

(54) DRIVING METHOD FOR PHOTO TRANSISTOR BY SUPPLYING AN ALTERNATE CURRENT VOLTAGE TO A GATE ELECTRODE AND PHOTO SENSOR AND FLAT PANEL DISPLAY USING THE SAME

(75) Inventor: Fu-Yuan Hsu, Miao-Li (TW)

(73) Assignee: Chimei Innolux Corporation, Miaoli County (TW)

( * ) Notice: Subject to any disclaimer, the term of this patent is extended or adjusted under 35 U.S.C. 154(b) by 730 days.

(21) Appl. No.: 12/386,603

(22) Filed: Apr. 20, 2009

(65) Prior Publication Data

US 2009/0261738 A1 Oct. 22, 2009

(30) Foreign Application Priority Data

Apr. 18, 2008 (CN) .......................... 2008 1 0066833

(51) Int. Cl.
*H01J 40/14* (2006.01)

(52) U.S. Cl. ................................. 250/214 R; 250/214.1
(58) Field of Classification Search ............. 250/214 R, 250/214.1, 208.1, 214 LA; 345/207, 48, 345/52; 257/290–292; 327/514
See application file for complete search history.

(56) References Cited

U.S. PATENT DOCUMENTS

| 6,856,351 | B1 | 2/2005 | Weisfield |
| 7,408,141 | B2 | 8/2008 | Chato et al. |
| 8,008,611 | B2 * | 8/2011 | Kim et al. ................. 250/208.1 |

FOREIGN PATENT DOCUMENTS

CN 1901363 A 1/2007
* cited by examiner

*Primary Examiner* — Que T Le
(74) *Attorney, Agent, or Firm* — Bacon & Thomas, PLLC

(57) ABSTRACT

A driving method for a photo transistor includes providing an alternating current (AC) voltage to a gate electrode of the photo transistor. A photo sensor using the driving method and a flat panel display using the photo sensor are also provided.

20 Claims, 2 Drawing Sheets

US 8,212,199 B2

DRIVING METHOD FOR PHOTO TRANSISTOR BY SUPPLYING AN ALTERNATE CURRENT VOLTAGE TO A GATE ELECTRODE AND PHOTO SENSOR AND FLAT PANEL DISPLAY USING THE SAME

BACKGROUND

1. Technical Field

The present invention relates to photo transistors, and more particularly to a driving method of a photo transistor, and a photo sensor and a flat panel display using the method.

2. Description of Related Art

Photo transistors and photo sensors using such photo transistors have the advantage of high sensitivity and have thus been widely used in various electronic devices, such as flat panel displays.

Referring to FIG. 6, a typical photo sensor 10 includes a photo transistor 11, a resistor 12, a first voltage terminal 13, a second voltage terminal 14, and a signal output terminal 15. The photo transistor 11 is an amorphous silicon (a-Si) thin film transistor (TFT), and includes a gate electrode 111, a source electrode 112, a drain electrode 113, and an a-Si layer (not shown). The gate electrode 111 is connected to the first voltage terminal 13. The source electrode 112 is connected to the second voltage terminal 14. The drain electrode 113 is connected to the signal output terminal 15 and to one end of the resistor 12. The other end of the resistor 12 is grounded.

The first voltage terminal 13 and the second voltage terminal 14 output a first voltage and a second voltage to the gate electrode 111 and the source electrode 112 respectively, to drive the photo transistor 11. The first voltage is five volts (5V) direct current (DC) voltage, and the second voltage is 1V DC voltage.

When the photo transistor 11 is exposed to light, the a-Si layer generates a plurality of photocarriers so as to produce photocurrent between the source electrode 112 and the drain electrode 113. In operation, with variations in the light intensity in external environments, the quantity of photocarriers and photocurrent correspondingly change. Thereby, a resistance between the source electrode 112 and the drain electrode 113 varies, and a signal output by the signal output terminal 15 correspondingly varies. As a result, the variations of light intensity can be measured.

Due to the first voltage used for driving the gate electrode 111 of the photo transistor 11 being a positive DC voltage, a plurality of electrons attracted by the first voltage reside in the a-Si layer of the photo transistor 11. These electrons can restrict the motion of the photocarriers, such that the photocurrent and the signal output by the signal output terminal 15 are weakened. Thus, the reliability of the photo sensor 10 using DC voltage to drive the photo transistor 11 is somewhat low.

What is needed is a driving method for a photo transistor which can overcome the limitations described, and a photo sensor using the driving method and a flat panel display using the photo sensor.

BRIEF DESCRIPTION OF THE DRAWINGS

The components in the drawings are not necessarily drawn to scale, the emphasis instead being placed upon clearly illustrating the principles of at least one embodiment. In the drawings, like reference numerals designate corresponding parts throughout the various views.

DETAILED DESCRIPTION

Reference will now be made to the drawings to describe exemplary embodiments of the present invention in detail.

Figure 1:
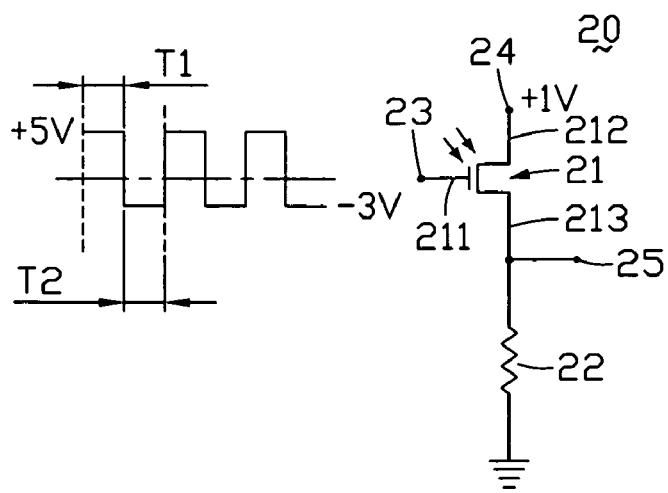
FIG. 1 is a circuit diagram of a photo sensor according to a first embodiment of the present invention, the photo sensor including a signal output terminal for outputting a signal.

FIG. 1 is a circuit diagram of a photo sensor 20 according to a first embodiment of the present invention. The photo sensor 20 includes a photo transistor 21, a resistor 22, a first voltage terminal 23, a second voltage terminal 24, and a signal output terminal 25. The photo transistor 21 is an amorphous silicon (a-Si) TFT, and includes a gate electrode 211, a source electrode 212, a drain electrode 213, and an a-Si layer (not shown) for generating photocarriers. The gate electrode 211 is connected to the first voltage terminal 23. The source electrode 212 is connected to the second voltage terminal 24. The drain electrode 213 is connected to the signal output terminal 25 and one end of the resistor 22. The other end of the resistor 22 is grounded.

The first voltage terminal 23 outputs a first voltage to the gate electrode 111 and the second voltage terminal 24 outputs a second voltage to the source electrode 112, to drive the photo transistor 21.

The first voltage terminal 23 is an AC voltage output terminal. The first voltage is an AC voltage. In detail, the first voltage is a continuous alternating square signal, and includes a frequency, a first amplitude, and a second amplitude. The frequency of the first voltage is in the range from greater than 0 hertz (Hz) to less than or equal to 100 Hz, and is preferably 0.4 Hz. The first amplitude of the first voltage is in the range from greater than 0V to less than or equal to 20V, and is preferably 5V. The second amplitude of the first voltage is in the range from less than or equal to −20V to less than 0V, and is preferably −3V. The duty ratio of the first amplitude is in the range from 1:11 to 10:11, and is preferably 1:2. The duty ratio of the second amplitude is also in the range from 1:11 to 10:11, and is also preferably 1:2.

The second voltage terminal 24 is a DC voltage output terminal. The second voltage is in range from 1V to 10V, and is preferably 1V.

In operation, a period of the first voltage can be divided into two sub-periods T1 and T2. A value of the first voltage is the first amplitude during sub-period T1. That is, the first voltage is a positive voltage, and a plurality of electrons are attracted by the first voltage and reside in the a-Si layer of the photo transistor 21. In the subsequent sub-period T2, the value of the first voltage is the second amplitude. That is, the first voltage is a negative voltage. A plurality of positive holes are attracted by the first voltage and neutralize said plurality of electrons in the a-Si layer of the photo transistor 21. As a result, most or even all of the photocarriers generated by the a-Si layer are not restricted by said plurality of electrons, and a corresponding signal output by the signal output terminal 25 can be steady. The light-electricity conversion efficiency of the photo transistor 21 and thus the photo sensor 20 is significant.

Figure 2:
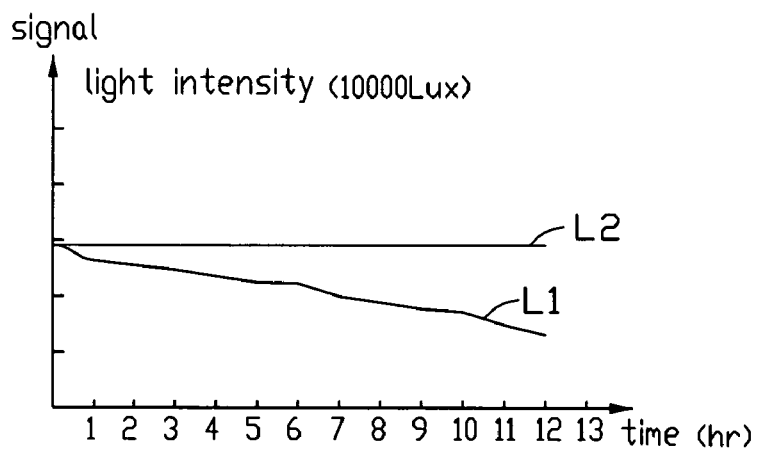
FIG. 2 is a comparison diagram of signals output by the signal output terminal of the photo sensor of FIG. 1, and signals output by a signal output terminal of the photo sensor of FIG. 6, under the same external environmental light intensity.

Referring to FIG. 2, a comparison of the signals output by the signal output terminals 15, 25 of the photo sensors 10, 20 under the same external environmental light intensity is shown. L1 is a plot of the signals of the output terminal 15 of the photo sensor 10. L2 is a plot of the signals of the output terminal 25 of the photo sensor 20. Under the same external environmental light intensity, the signal L1 of the output terminal 15 begins to weaken from a tome about 5 minutes after the photo sensor 10 is enabled; whereas the signal L2 of the output terminal 25 remains substantially steady even 13 hours after the photo sensor 20 is enabled.

Figure 3:
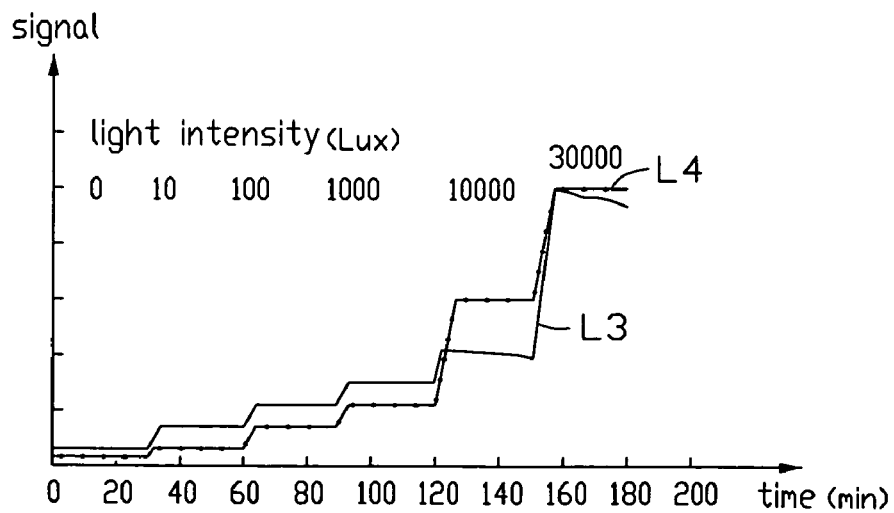
FIG. 3 is a comparison diagram of signals output by the signal output terminals of the photo sensors of FIG. 1 and FIG. 6, under gradually increasing light intensity of the external environment.

Referring to FIG. 3, a comparison of the signals output by the signal output terminals 15, 25 of the photo sensors 10, 20 under gradually increasing external environmental light intensity is shown. In the illustration, the light intensity is increased in steps, with a ramp-up from one step to the next. L3 is a plot of the signals of the output terminal 15 of the photo sensor 10. L4 is a plot of the signals of the output terminal 25 of the photo sensor 20. Under the illustrated regime of gradually increasing external environmental light intensity, the signal L3 of the output terminal 15 begins to exhibit weakening about 2 hours after the photo sensor 10 is enabled; whereas the signal L4 of the output terminal 25 exhibits substantial steadiness even 3 hours after the photo sensor 20 is enabled.

In summary, the gate electrode 211 of the photo transistor 21 is provided with an AC voltage, and electrons attracted by the positive cycle of the AC voltage can be neutralized by the positive holes attracted by the negative cycle of the AC voltage. As a result, most or even all of the photocarriers are not restricted by said electrons, and the signal output by the signal output terminal 25 can be very steady. The light-electricity transfer conversion of the photo transistor 21 and the photo sensor 20 are improved. Accordingly, the reliability of the photo sensor 20 is also improved.

Figure 4:
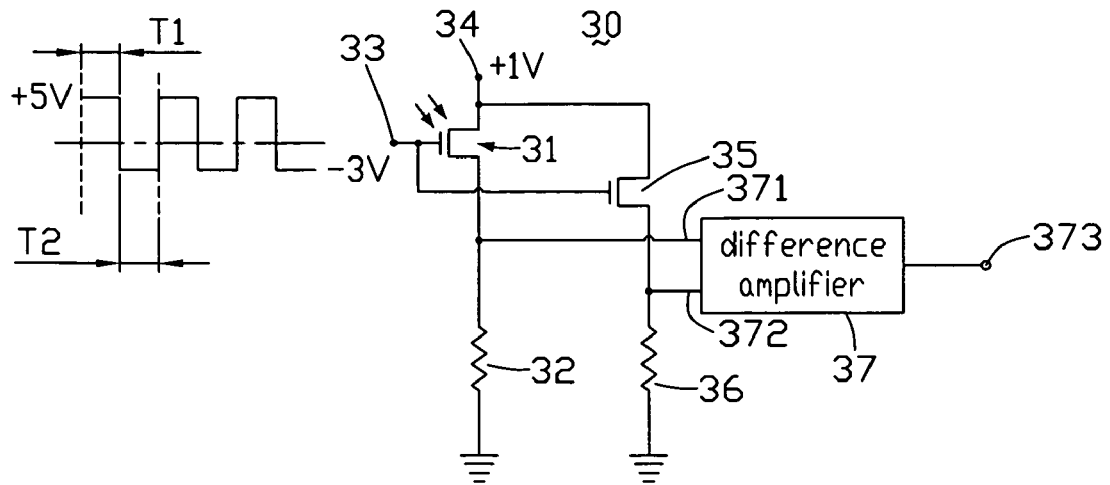
FIG. 4 is a circuit diagram of a photo sensor according to a second embodiment of the present invention.

Referring to FIG. 4, a circuit diagram of a photo sensor 30 according to a second embodiment of the present invention is shown. The photo sensor 30 includes a first TFT 31, a second TFT 35, a first resistor 32, a second resistor 36, a first voltage terminal 33, a second voltage terminal 34, and a difference amplifier 37. The first TFT 31 and the second TFT 35 are a-Si TFTs, and each includes a gate electrode (not labeled), a source electrode (not labeled), and a drain electrode (not labeled). The difference amplifier 37 includes two input terminals 371, 372 and an output terminal 373.

The gate electrodes of the first and the second TFTs 31, 35 are connected to the first voltage terminal 33. The source electrodes of the first and the second TFTs 31, 35 are connected to the second voltage terminal 34. The drain electrode of the first TFT 31 is connected to the input terminal 371 and to one end of the first resistor 32. The other end of the first resistor 32 is grounded. The drain electrode of the second TFT 35 is connected to the input terminal 372 and to one end of the second resistor 36. The other end of the second resistor 36 is grounded.

The first voltage terminal 33 outputs a first voltage to the gate electrodes of the first and the second TFTs 31, 35, and the second voltage terminal 34 outputs a second voltage to the source electrodes of the first and the second TFTs 31, 35, to drive the first and the second TFTs 31, 35.

The first voltage terminal 33 is an AC voltage output terminal. The first voltage is an AC voltage. In detail, the first voltage is a continuous alternating square signal, and includes a frequency, a first amplitude, and a second amplitude. The frequency of the first voltage is in the range from greater than 0 Hz to less than or equal to 100 Hz, and is preferably 0.4 Hz. The first amplitude of the first voltage is in the range from greater than 0V to less than or equal to 20V, and is preferably 5V. The second amplitude of the first voltage is in the range from less than or equal to −20V to less than 0V, and is preferably −3V. The duty ratio of the first amplitude is in the range from 1:11 to 10:11, and is preferably 1:2. The duty ratio of the second amplitude is also in the range from 1:11 to 10:11, and is also preferably 1:2.

The second voltage terminal 34 is a DC voltage output terminal. The second voltage is in the range from 1V to 10V, and is preferably 1V.

The first and the second resistors 32, 36 have the same impedance. The first TFT 31 serves as a photo transistor. The second TFT 35 serves as a comparing transistor, and is shaded by an object, such that light of the external environment is prevented from reaching the second TFT 35.

In operation, due to the first TFT 31 serving as a photo transistor and the second TFT 35 being shaded, the first TFT 31 generates a quantity of photocarriers that the second TFT 35 does not. This causes the resistance between the source electrode and the drain electrode of the first TFT 31 to differ from that between the source electrode and the drain electrode of the second TFT 35. Thereby, the signals of the two input terminals 371, 372 are correspondingly different, with a difference value therebetween considered as a light intensity signal of the external environment. Because the difference value is typically small, the difference amplifier 37 amplifies the difference value.

In summary, the gate electrode of the first TFT 31 is provided with an AC voltage, and electrons attracted by the positive cycle of the AC voltage can be neutralized by positive holes attracted by the negative cycle of the AC voltage. As a result, most or even all the photocarriers generated by the first TFT 31 are not be restricted by said electrons, and a signal of the output terminal 373 can be steady. Thus, the light-electricity conversion efficiency of the first TFT 31 and thus the photo sensor 30 may be considerable. Accordingly, the reliability of the photo sensor 30 is also improved.

Figure 5:
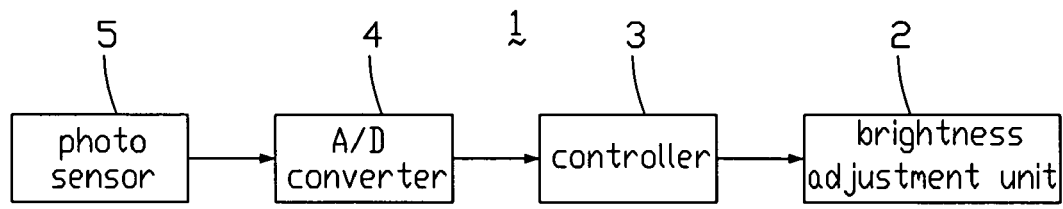
FIG. 5 is a block diagram of a flat panel display according to the present invention.
Figure 6:
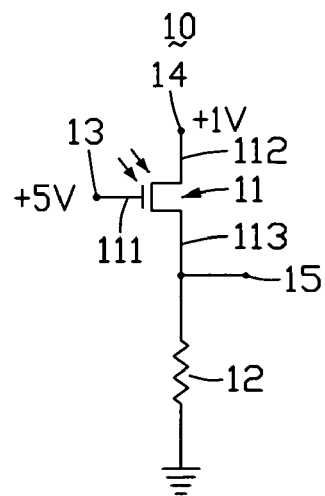
FIG. 6 is a diagram of a conventional photo sensor, the photo sensor including a signal output terminal for outputting a signal.

Referring to FIG. 5, a block diagram of a flat panel display 1 according to the present invention is shown. The flat panel display 1 includes a brightness adjustment unit 2, a controller 3, an analog to digital (A/D) converter 4, and a photo sensor 5. The photo sensor 5 can be the same as the photo sensor 20 or 30.

The photo sensor 5 provides a light intensity signal to the A/D converter 4. The A/D converter 4 converts the light intensity signal to a digital signal. The controller 3 outputs an adjustment signal to the brightness adjustment unit 2 according to the digital signal. The brightness adjustment unit 2 adjusts the brightness of the flat panel display 1 accordingly. The improved performance of the photo sensor 20 or 30 provides corresponding improvement in the reliability of the flat panel display 1.

It is to be understood, however, that even though numerous characteristics and advantages of the present embodiments have been set out in the foregoing description, together with details of the structures and functions of the embodiments, the invention is illustrative only; and that changes may be made in detail, especially in matters of arrangement of parts within the principles of the invention to the full extent indicated by the broad general meaning of the terms in which the appended claims are expressed.

The invention claimed is:

1. A driving method for a photo transistor, comprising providing an alternating current (AC) voltage to a gate electrode of the photo transistor.

2. The driving method of claim 1, further comprising providing a direct current (DC) voltage to a source electrode of the photo transistor.

3. The driving method of claim 1, wherein the AC voltage is a continuous alternating square signal comprising a frequency, a first amplitude, and a second amplitude.

4. The driving method of claim 3, wherein the frequency is in the range from greater than 0 Hz to less than or equal to 100 Hz.

5. The driving method of claim 3, wherein the first amplitude is in the range from greater than 0V to less than or equal to 20V.

6. The driving method of claim 3, wherein the second amplitude is in the range from less than or equal to −20V to less than 0V.

7. The driving method of claim 3, wherein a duty ratio of the first amplitude is in the range from 1:11 to 10:11.

8. The driving method of claim 3, wherein a duty ratio of the second amplitude is in the range from 1:11 to 10:11.

9. The driving method of claim 3, wherein the frequency is approximately 0.4 HZ, the first amplitude is approximately 5V, the second amplitude is approximately 1V, a duty ratio of the first amplitude is approximately 1:2, and a duty ratio of the second amplitude is approximately 1:2.

10. A photo sensor comprising:
a photo transistor configured to sense light intensity,
wherein a gate electrode of the photo transistor is capable of receiving an alternating current (AC) voltage.

11. The photo sensor of claim 10, further comprising an AC voltage output terminal capable of outputting the AC voltage to the gate electrode.

12. The photo sensor of claim 11, further comprising a DC voltage output terminal configured for outputting a DC voltage to a source of the photo transistor.

13. The photo sensor of claim 12, further comprising a resistor and a signal output terminal, a drain electrode of the photo transistor being connected to the signal output terminal and capable of being grounded via the resistor.

14. The photo sensor of claim 12, further comprising a comparing transistor being shaded, a first resistor, a second resistor, and a difference amplifier comprising two input terminals and an output terminal, a gate electrode of the comparing transistor being connected to the gate electrode of the photo transistor, a source electrode of the comparing transistor being connected to the source electrode of the photo transistor, a drain electrode of the photo transistor being connected to one input terminal and capable of being grounded via the first resistor, a drain electrode of the comparing transistor being connected to the other input terminal and capable of being grounded via the second resistor, and the output terminal capable of outputting a light intensity signal.

15. The photo sensor of claim 12, wherein the DC voltage is in range from 1V to 10V.

16. The photo sensor of claim 12, wherein the AC voltage is a continuous alternating square signal comprising a frequency, a first amplitude, and a second amplitude.

17. The photo sensor of claim 16, wherein the frequency is in the range from greater than 0 hertz (Hz) to less than or equal to 100 Hz, the first amplitude is in the range from greater than 0V to less than or equal to 20V, the second amplitude is in the range from less than or equal to −20V to less than 0V, a duty ratio of the first amplitude is in range from 1:11 to 10:11, and a duty ratio of the second amplitude is in range from 1:11 to 10:11.

18. The photo sensor of claim 16, wherein the frequency is approximately 0.4 Hz, the first amplitude is approximately 5V, the second amplitude is approximately 1V, a duty ratio of the first amplitude is approximately 1:2, a duty ratio of the second amplitude is approximately 1:2, and the DC voltage is approximately 1V.

19. The photo sensor of claim 12, wherein the photo transistor comprises an amorphous silicon (a-Si) thin film transistor.

20. A flat panel display comprising:
a photo sensor comprising a photo transistor and configured to provide a light intensity signal,
an analog to digital (A/D) converter configured to convert the light intensity signal to a digital signal,
a controller configured to output an adjustment signal according to the digital signal, and
a brightness adjustment unit configured to adjust brightness of the flat panel display according to the adjustment signal,
wherein a gate electrode of the photo transistor is capable of receiving an alternating current (AC) voltage driving signal.

* * * * *